(12) United States Patent
Sasaki

(10) Patent No.: US 9,114,694 B2
(45) Date of Patent: Aug. 25, 2015

(54) MOLDED PRODUCT

(71) Applicant: TOKAI KOGYO CO., LTD., Obu, Aichi (JP)

(72) Inventor: Takuya Sasaki, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 0 days.

(21) Appl. No.: 14/220,767

(22) Filed: Mar. 20, 2014

(65) Prior Publication Data

US 2014/0306480 A1 Oct. 16, 2014

(30) Foreign Application Priority Data

Apr. 11, 2013 (JP) .................................. 2013-082714

(51) Int. Cl.
*B60J 10/02* (2006.01)
*B60J 10/00* (2006.01)

(52) U.S. Cl.
CPC .............. *B60J 10/02* (2013.01); *B60J 10/0045* (2013.01)

(58) Field of Classification Search
CPC ..... B60J 10/02; B60J 10/0014; B60J 10/0045
USPC ........................................... 296/93, 154, 208
See application file for complete search history.

(56) References Cited

U.S. PATENT DOCUMENTS

| | | | |
|---|---|---|---|
| 4,805,363 A * | 2/1989 | Gold | 52/208 |
| 4,984,839 A * | 1/1991 | Miyakawa et al. | 296/93 |
| 5,489,354 A * | 2/1996 | Gold | 156/108 |
| 5,588,691 A * | 12/1996 | Yada et al. | 296/93 |
| 5,618,079 A * | 4/1997 | Yukihiko et al. | 296/93 |
| 6,196,615 B1 * | 3/2001 | Yada | 296/93 |
| 6,715,821 B2 * | 4/2004 | Kanie et al. | 296/146.15 |
| 7,118,169 B2 * | 10/2006 | Hara et al. | 296/208 |
| 8,146,979 B2 * | 4/2012 | Renke et al. | 296/93 |
| 2005/0189780 A1 | 9/2005 | Hara et al. | |

FOREIGN PATENT DOCUMENTS

| | | | |
|---|---|---|---|
| JP | S49-140818 U | 12/1974 | |
| JP | S59-184013 A | 10/1984 | |
| JP | S59-184014 A | 10/1984 | |
| JP | 60-146718 * | 8/1985 | 296/93 |
| JP | H02-012922 U | 1/1990 | |

(Continued)

OTHER PUBLICATIONS

Feb. 24, 2015 Office Action issued in Patent Application No. 2013-082714.

*Primary Examiner* — Gregory Blankenship
(74) *Attorney, Agent, or Firm* — Oliff PLC

(57) ABSTRACT

A molded product configured to be arranged along at least a portion of a lower corner portion of a window pane, the molded product comprising: an inward portion that faces an inner circumferential side of the window pane and abuts against a surface of the window pane; and at least one drainage passage that is provided to a portion of the inward portion arranged along the lower corner portion and that passes through the inward portion in inner and outer circumferential directions of the window pane, wherein an inlet portion of the drainage passage opens toward the inner circumferential side of the window pane, and wherein an outlet portion of the drainage passage is arranged further toward an outer circumferential side of the window pane than an end surface of the window pane and is spaced apart from the surface of the window pane.

10 Claims, 8 Drawing Sheets

B-B CROSS-SECTIONAL VIEW

(56) References Cited

FOREIGN PATENT DOCUMENTS

| JP | H07-290969 A | 11/1995 |
| JP | A-2005-206026 | 8/2005 |
| JP | 2012-214183 A | 11/2012 |

* cited by examiner

A-A CROSS-SECTIONAL VIEW

B-B CROSS-SECTIONAL VIEW

C-C CROSS-SECTIONAL VIEW

D-D CROSS-SECTIONAL VIEW

E-E CROSS-SECTIONAL VIEW

MOLDED PRODUCT

CROSS-REFERENCE TO RELATED APPLICATIONS

This application claims priority from Japanese Patent Application No. 2013-082714 filed on Apr. 11, 2013, the entire contents of which are incorporated herein by reference.

TECHNICAL FIELD

Aspects of the present invention relate to a molded product arranged along at least a lower corner portion of a window pane attached to a window frame of a vehicle.

BACKGROUND

As front pillar garnishes arranged along front pillars of vehicles (along side edges of window panes), for example, JP-A-2005-206026 describes a front pillar garnish in which an ornamental head portion that covers a space between a body panel and a window pane, a groove wall portion that protrudes from a back side of an inward portion of the ornamental head portion and forms a rainwater-receiving groove, and a mounting leg portion that protrudes from a back side of an outward portion of the ornamental head portion are provided integrally, and rainwater carried to a side portion of the window pane by a wiper is made to flow along the rainwater-receiving groove of the front pillar garnish.

SUMMARY

In the technique of JP-A-2005-206026, rainwater flows along the rainwater-receiving groove of the front pillar garnish. However, there is a concern that rainwater flowing to a lower corner portion of the window pane along the rainwater-receiving groove may further flow along the lower edge of the window pane and thereby drop at the vicinity of a center of the vehicle in a width direction. If rainwater drops at the vicinity of the center of the vehicle in its width direction, there is a concern that electric parts, such as a wiper motor installed near the center, may get wet and electric parts may fail.

Accordingly, an object to be achieved by an aspect of the invention is to provide a molded product that can prevent rainwater flowing to a lower corner portion of a window pane from flowing along a lower edge of the window pane and thereby dropping at the vicinity of the center of a vehicle in the width direction.

According to an aspect of the invention, there is provided a molded product made of resin or rubber and configured to be arranged along at least a portion of a lower corner portion of a window pane that is configured to be attached to a window frame of a vehicle, the molded product including: an inward portion that faces an inner circumferential side of the window pane and abuts against a surface of the window pane when the molded product is arranged along at least the portion of the lower corner portion; and at least one drainage passage that is provided to a portion of the inward portion arranged along the lower corner portion and that passes through the inward portion in inner and outer circumferential directions of the window pane, wherein an inlet portion of the drainage passage opens toward the inner circumferential side of the window pane, and wherein an outlet portion of the drainage passage is arranged further toward an outer circumferential side of the window pane than an end surface of the window pane and is spaced apart from the surface of the window pane.

Accordingly, rainwater that flows to the lower corner portion of the window pane along the surface of the window pane or the inward portion of the molded product can be drained by the drainage passage. In that case, since the outlet portion of the drainage passage is arranged further toward the outer circumferential side of the window pane than the end surface of the window pane and is spaced apart from the surface of the window pane, rainwater discharged from the outlet portion of the drainage passage can be made to flow to a position distant from the window pane. This can prevent rainwater flowing to the lower corner portion of the window pane from flowing along the lower edge of the window pane and dropping at the vicinity of the center of the vehicle in the width direction than the outlet portion of the drainage passage.

DETAILED DESCRIPTION

Hereinafter, several embodiments in which modes for carrying out the invention are implemented will be described.

First Embodiment

A first embodiment of the invention will be described with reference to FIGS. 1 to 5.

Figure 1:
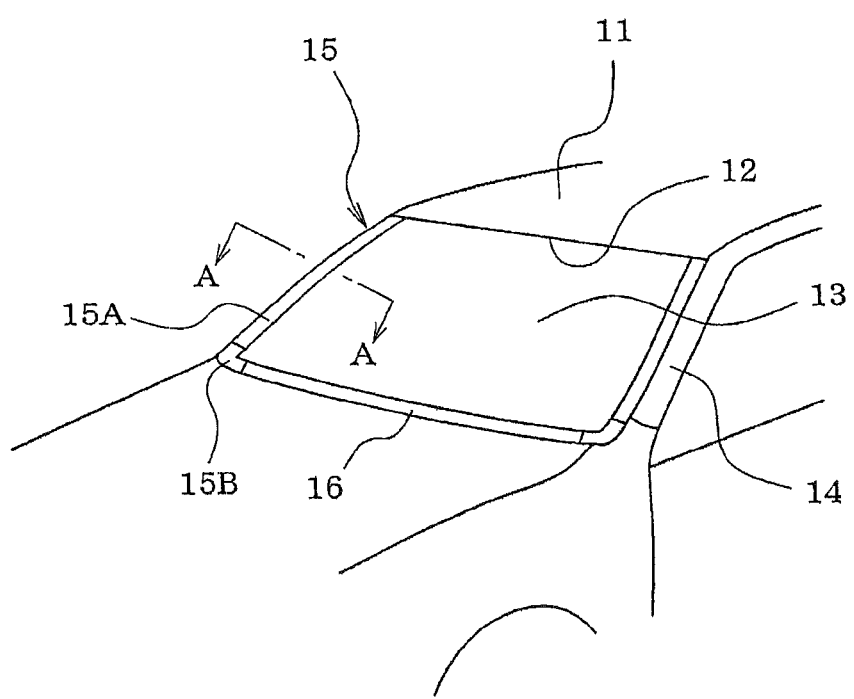
FIG. 1 is a perspective view of a front window and its circumferential portion of a vehicle showing a state where a front pillar garnish in a first embodiment of the invention is mounted.

As shown in FIG. 1, a window pane 13 (windshield) is assembled on a window frame 12 for a front window formed to a body panel 11 of an automobile, and front pillars 14 are respectively provided on both side portions of the window frame 12. An elongated front pillar garnish 15 (molded product) is mounted along each front pillar 14 (that is, each side edge of the window pane 13), and a portion between the front pillar 14 and the window pane 13 is covered with the front pillar garnish 15. In the first embodiment, the front pillar garnish 15 is arranged continuously from a side edge of an upper corner portion of the window pane 13 along a side edge and a lower edge of the lower corner portion, and a cowl louver 16 is arranged along a lower edge of the window pane 13.

Figure 2:
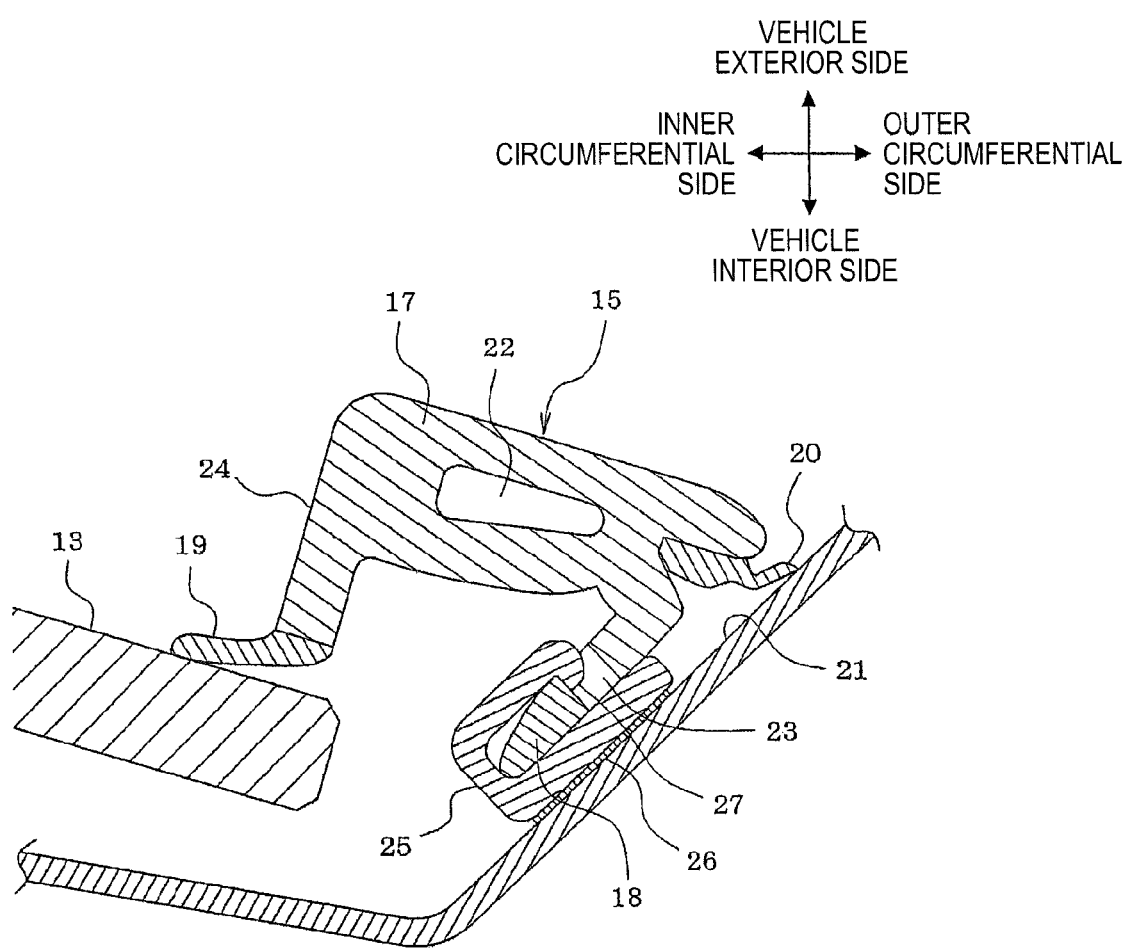
FIG. 2 is an A-A cross-sectional view of FIG. 1.

As shown in FIG. 2, a main body 17, an attachment portion 18, a seal portion 19, and a lip portion 20 are integrally provided in the portion (hereinafter referred to as "a straight portion") 15A of the front pillar garnish 15 that is arranged along the portion (a side edge from the upper corner portion of the window pane 13 to a portion immediately before the lower corner portion thereof) excluding the lower corner portion of the window pane 13. The main body 17 and the attachment portion 18 are formed from, for example, polymer materials, such as acrylonitrile ethylenepropylene styrene resin (AES resin). Additionally, the seal portion 19 and the lip portion 20 are formed from, for example, polymer materials, such as olefin-based thermoplastic elastomer (TPO), which are softer than the main body 17.

The main body 17 is formed so as to cover a gap between the inner circumferential wall 21 (a circumferential edge of a window opening portion) of the front pillar 14 and the side edge of the window pane 13, and a hollow portion 22 (a gas channel formed by gas assist injection molding to be described below) is formed inside the main body 17. The attachment portion 18 is formed so as to protrude from the region of the main body 17 located further toward an outer circumferential side of the window pane 13 than the seal portion 19, and the attachment portion 18 is formed with an engagement hole 23.

The seal portion 19 is formed so as to protrude from the main body 17 toward an inner circumferential side of the window pane 13 and abut against the surface of the window pane 13, and the lip portion 20 is formed so as to protrude from the main body 17 toward the outer circumferential side of the window pane 13 and abut against the inner circumferential wall 21 of the front pillar 14. Additionally, the portions of the main body 17 and the seal portion 19 that faces the inner circumferential side of the window pane 13 are defined as an inward portion 24.

A clip 25 is fixed to the inner circumferential wall 21 of the front pillar 14 by a double sided tape 26 or the like, and the front pillar garnish 15 is mounted along the front pillar 14 by an engagement claw 27 of the clip 25 being engaged with the engagement hole 23 of the attachment portion 18.

Figure 3:
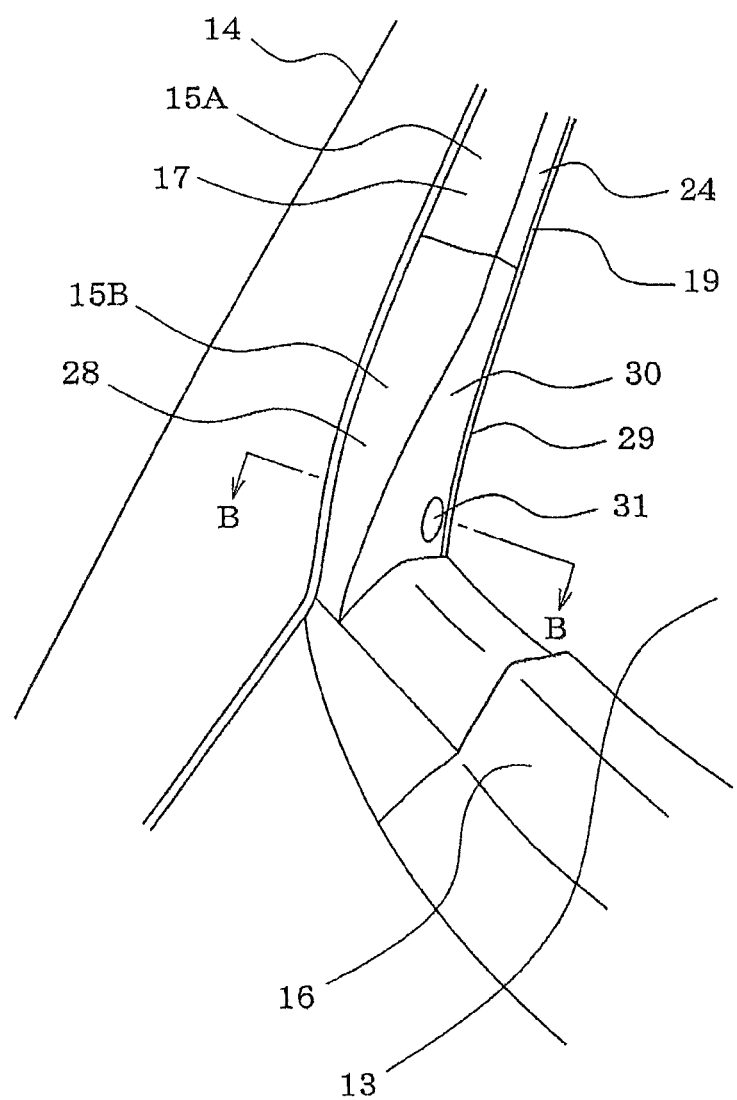
FIG. 3 is a perspective view of the periphery of a lower corner portion of the front window in the vehicle on which the front pillar garnish of the first embodiment is mounted.
Figure 4:
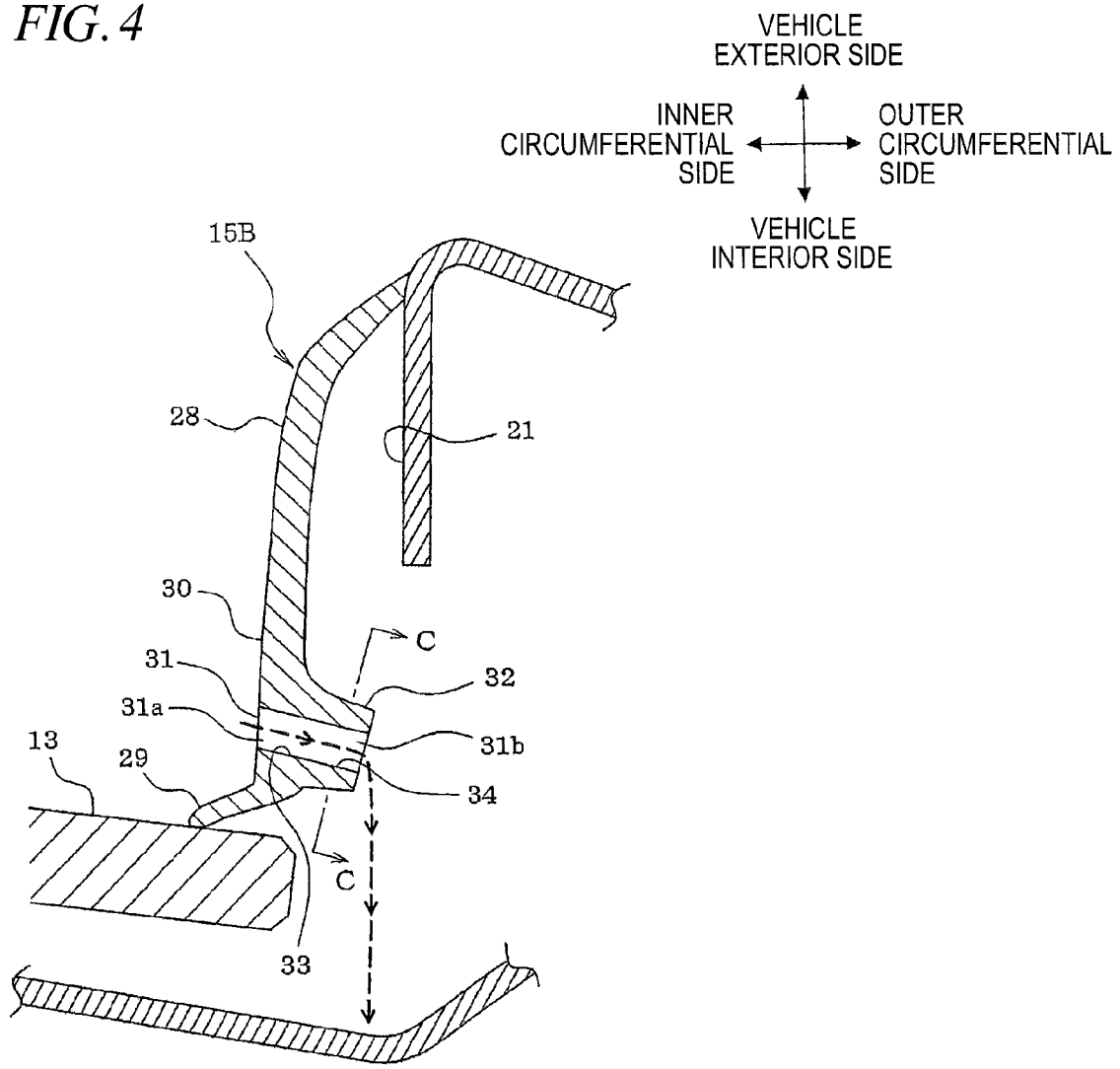
FIG. 4 is a B-B cross-sectional view of FIG. 3.

As shown in FIGS. 3 and 4, the main body 28 and the seal portion 29 are integrally provided in the portion (hereinafter referred to as a "corner portion") 15B of the front garnish 15 that is arranged along the lower corner portion (the side edge and lower edge of the lower corner portion) of the window pane 13. Additionally, the main body 28 and the seal portion 29 are formed from, for example, polymer materials, such as TPO, which are softer than the main body 17 of the straight portion 15A. Additionally, the portions of the main body 28 and the seal portion 29 that faces the inner circumferential side of the window pane 13 are defined as an inward portion 30.

A drainage passage 31 is provided to the portion of the inward portion 30 of the corner portion 15B, which corresponds to the main body 28 and is arranged along the side edge of the lower corner portion of the window pane 13, so as to pass through the inward portion 30 (the main body 28) in inner and outer circumferential directions of the window pane 13. An inlet portion 31a of the drainage passage 31 opens to the inner circumferential side of the window pane 13. Additionally, an outlet portion 31b of the drainage passage 31 is arranged further toward the outer circumferential side of the window pane 13 than an end surface of the window pane 13 and is spaced apart from the surface of the window pane 13.

Figure 5:
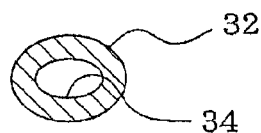
FIG. 5 is a C-C cross-sectional view of FIG. 4.

In the first embodiment, a protrusion 32 that protrudes from the inward portion 30 toward the outer circumferential side of the window pane 13 is provided, and the drainage passage 31 is formed by a hole portion 33 provided to the inward portion 30 (the main body 28) and a water channel 34 provided to the protrusion 32. As shown in FIGS. 4 and 5, the protrusion 32 is formed in a substantially columnar shape (for example, columnar or elliptically columnar), and the water channel 34 is a through hole formed so as to pass through the protrusion 34. The shape of the protrusion 32 is not limited to the substantially columnar shape, and may be other shapes (for example, a triangular prismatic shape, a quadratic prismatic shape, and the like).

As shown in FIG. 3, since the front pillar garnish 15 (the straight portion 15A and the corner portion 15B) is arranged continuously from along the side edge of the upper corner portion of the window pane 13 to along the side edge and lower edge of the lower corner portion, there is no joint (cut) in a portion along the lower corner portion of the window pane 13 where rainwater is easily pooled, and the inward portion 30 of the corner portion 15B continuously abuts against a portion from the side edge of the lower corner portion of the window pane 13 to the lower edge thereof.

Additionally, by arranging the front pillar garnish 15 from the side edge of the upper corner portion of the window pane 13 along the side edge of the lower corner portion of the window pane 13, rainwater carried to a side portion of the window pane 13 by a wiper (not shown) can be made to flow to the lower corner portion of the window pane 13 by the inward portions 24 and 30 of the front pillar garnish 15, and rainwater that has flowed to the lower corner portion of the window pane 13 can be drained by the drainage passage 31.

Additionally, the portion of the corner portion 15B of the front pillar garnish 15 that is arranged along the lower edge of the lower corner portion of the window pane 13 is fixed in a state of being sandwiched between the cowl louver 16 and the surface of the lower edge of the window pane 13.

Although a part of the portion of the corner portions 15B of the front pillar garnish 15 that is arranged along the lower edge of the lower corner portion of the window pane 13 may be covered with the cowl louver 16, the entire portion of the corner portion 15B that is arranged along the lower edge of the lower corner portion of the window pane 13 may be covered with the cowl louver 16. Additionally, the portion of the corner portions 15B that is arranged along the lower edge of the lower corner portion of the window pane 13 may be fixed to the body panel 11 with a double sided tape, a clip, or the like.

When the front pillar garnish 15 (the straight portion 15A and the corner portion 15B) is manufactured, for example, the following steps (1) to (3) are performed.

(1) Step of Molding Main Body 17 and Attachment Portion 18 of Straight Portion 15A By performing gas assist injection molding of injecting and filling a polymer material (for example, AES resin) into an injection mold for molding the main body 17 and the attachment portion 18 of the straight portion 15A and also injecting gas (for example, nitrogen gas) into an injection mold, the main body 17 having the hollow portion 22 (gas channel) and the attachment portion 18 are molded.

(2) Step of Molding Seal Portion 19 and Lip Portion 20 of Straight Portion 15A

The injection molding of setting the partly-finished product (the main body 17 and the attachment portion 18) molded in Step (1) in an injection mold for molding the seal portion 19 and the lip portion 20 of the straight portion 15A and of injecting and filling a polymer material (for example, TPO) into the injection mold is performed. In this way, the seal portion 19 and the lip portion 20 are molded, and the seal portion 19 and the lip portion 20 are welded to and integrated with the partly-finished product molded in Step (1). This completes the manufacture of the straight portion 15A.

(3) Step of Molding Corner Portion 15B (Main Body 28 and Seal Portion 29)

The injection molding of setting the partly-finished product (straight portion 15A) molded in Step (2) in the injection mold for molding the corner portion 15B (the main body 28 and the seal portion 29) and of injecting and filling a polymer material (for example, TPO) into the injection mold is performed. In this way, the corner portion 15B is molded, and the corner portion 15B is welded to and integrated with the partly-finished product molded in Step (2). This completes the manufacture of the front pillar garnish 15.

In addition, in the above description, the gas assist injection molding is performed in Step (1). However, the invention is not limited thereto, and the main body 17 and the attachment portion 18 may be molded by performing ordinary injection molding (injection molding that does not perform gas assist) and ordinary extrusion molding.

Additionally, in the above description, Step (2) and Step (3) are separately performed. However, the invention is not limited to this, and Step (2) and Step (3) may be simultaneously performed.

Additionally, in the above description, the molding and welding of the seal portion 19 and the lip portion 20 are simultaneously performed in Step (2). However, the invention is not limited to this. For example, the seal portion 19 and the lip portion 20 may first be molded by injection molding or extrusion molding, and the seal portion 19 and the lip portion 20 may then be bonded with an adhesive or the like or welded to the partly-finished product molded in Step (1). Additionally, if the main body 17 and the attachment portion 18 are extrusion-molded, the main body 17 and the attachment portion 18, and the seal portion 19 and the lip portion 20, respectively, may be co-extrusion-molded.

Additionally, in the above description, the molding and welding of the corner portion 15B are simultaneously performed in Step (3). However, the invention is not limited thereto. For example, the corner portion 15B may first be molded by injection molding or extrusion molding, and the seal corner portion 15B may then be bonded with an adhesive or the like or welded to the partly-finished product molded in Step (2).

Additionally, in the above description, the corner portion 15B is molded in Step (3). However, the invention is not limited to this. For example, only the portion of the corner portion 15B that is arranged at the lower edge of the lower corner portion of the window pane 13 may be molded in Step (3), and the remaining portion (the portion arranged at the side edge of the lower corner portion of the window pane 13) may be molded in Steps (1) and (2).

Additionally, in the above description, AES resin is used as the polymer material that molds the main body 17 and the attachment portion 18 of the straight portion 15A in Step (1). However, the invention is not limited to this. For example, resins, such as polypropylene resin (PP resin), acrylonitrile butadiene styrene resin (ABS resin), polystyrene resin (PS resin), and polyvinyl chloride resin (PVC resin), may be used, or rubber, such as ethylene propylene diene terpolymer (EPDM), may be used.

Additionally, in the above description, TPO is used as the polymer material that molds the seal portion 19 and the lip portion 20 of the straight portion 15A and the corner portion 15B in Steps (2) and (3). However, the invention is not limited to this. For example, styrene thermoplastic elastomer (SBC), PVC resin, or the like may be used. Additionally, when rubber, such as EPDM, is used in Step (1), it is preferable to use rubber, such as EPDM, also in Steps (2) and (3). In any case, as the polymer material to be used in Steps (2) and (3), it is preferable to use a material softer than the polymer material to be used in Step (1).

In the first embodiment described above, the drainage passage 31 is provided to the portion of the inward portion 30 of the corner portion 15B of the front pillar garnish 15, which corresponds to the main body 28 and is arranged along the side edge of the lower corner portion of the window pane 13. For this reason, rainwater that flows to the lower corner portion of the window pane 13 along the surface of the window pane 13 or the inward portions 24 and 30 of the front pillar garnish 15 can be drained by the drainage passage 31. Moreover, since the outlet portion 31b of the drainage passage 31 is arranged further toward the outer circumferential side of the window pane 13 than the end surface of the window pane 13 and is spaced apart from the surface of the window pane 13, as shown by a dotted line arrow in FIG. 4, rainwater discharged from the outlet portion 31b of the drainage passage 31 can be made to flow to a position distant from the window pane 13. Since this can prevent rainwater flowing to the lower corner portion of the window pane 13 from dropping along the lower edge of the window pane 13 further toward a central side of the vehicle in the width direction than the outlet portion 31b of the drainage passage 31, electric parts, such as a wiper motor installed near the center of the vehicle in the width direction, can be prevented from getting wet and failing due to rainwater.

Additionally, in the first embodiment, the protrusion 32 that protrudes from the inward portion 30 toward the outer circumferential side of the window pane 13 is provided, and the drainage passage 31 includes the hole portion 33 provided to the inward portion 30 (main body 28) and the water channel 34 provided to the protrusion 32. Accordingly, the distance from the end surface of the window pane 13 to the outlet portion 31b of the drainage passage 31 can be lengthened, and rainwater discharged from the outlet portion 31b of the drainage passage 31 can be reliably made to flow to a position distant from the window pane 13.

Moreover, in the first embodiment, the water channel 34 of the drainage passage 31 is the through hole formed to the protrusion 32. Accordingly, rainwater passing through the drainage passage 31 can be prevented from falling from the water channel 34 (through hole).

Additionally, in the first embodiment, the front pillar garnish 15 is arranged continuously from along the side edge of the upper corner portion of the window pane 13 to along the side edge and lower edge of the lower corner portion of the window pane 13 so that the inward portion 30 of the corner portion 15B continuously abuts against a portion from the side edge of the lower corner portion of the window pane 13 to the lower edge of the window pane 13. This can prevent rainwater from entering the outer circumferential side of the window pane 13 from the inward portion 30 arranged at the lower corner portion of the window pane 13.

Moreover, in the first embodiment, the drainage passage 31 is provided to the portion of the inward portion 30 of the corner portion 15B that is arranged along the side edge of the lower corner portion of the window pane 13. For this reason, rainwater that flows to the lower corner portion of the window pane 13 along the inward portions 24 and 30 can be effectively drained by the drainage passage 31.

Second Embodiment

Next, a second embodiment of the invention will be described with reference to FIGS. 6 to 7. However, substantially the same portions as in the aforementioned first embodiment will be described by the same reference numerals, and the description thereof will be omitted or simplified, and portions different from in the aforementioned first embodiment will mainly be described.

Figure 6:
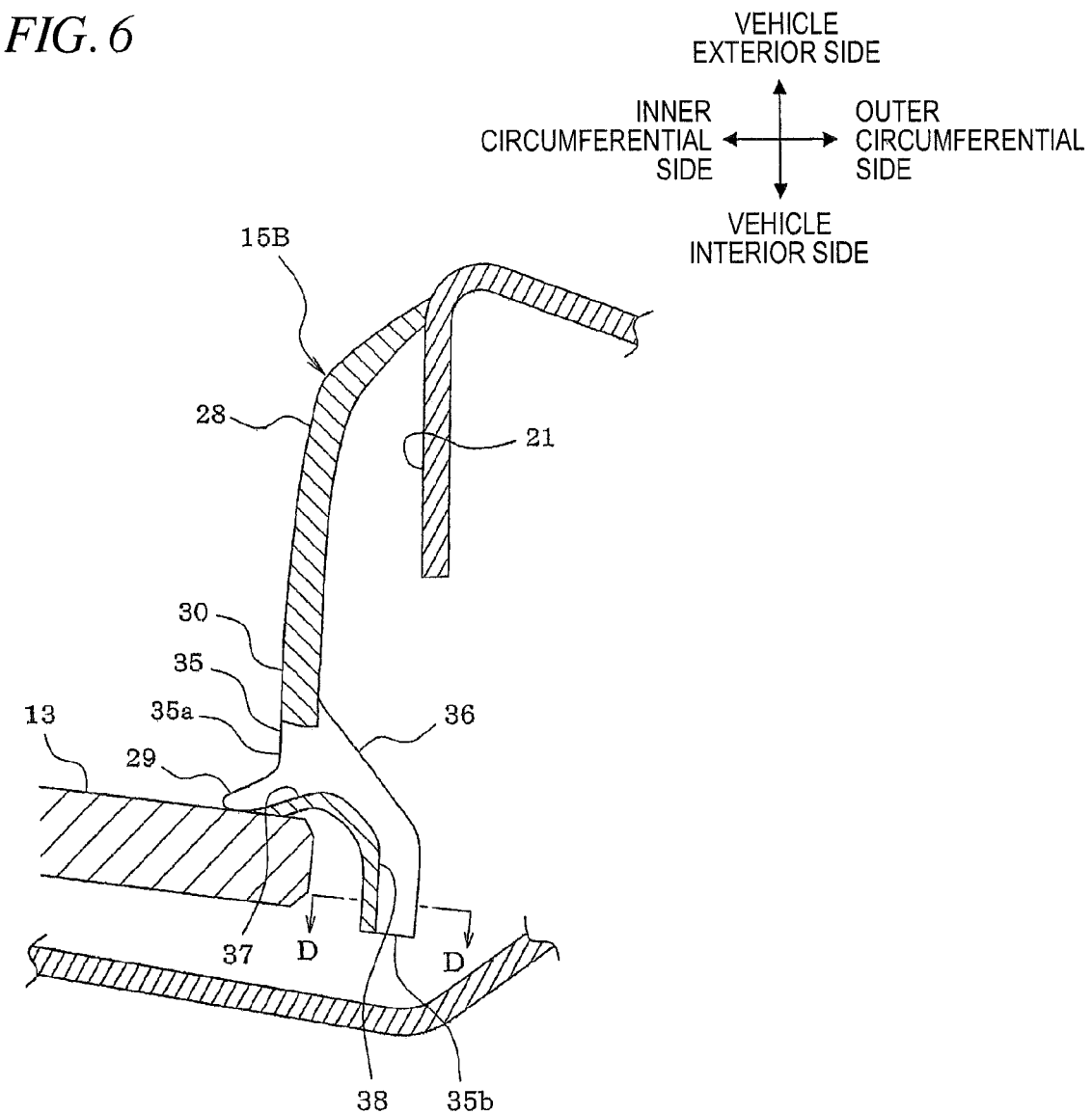
FIG. 6 is a cross-sectional view corresponding to the B-B cross-sectional view of FIG. 3 when a front pillar garnish of a second embodiment is mounted on a vehicle.
Figure 7:
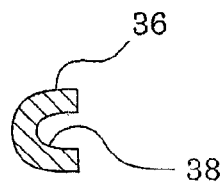
FIG. 7 is a D-D cross-sectional view of FIG. 6.

In the second embodiment, as shown in FIG. 6, a drainage passage 35 is provided to the portion of the inward portion 30 of the corner portion 15B, which corresponds to the main body 28 and the seal portion 29 and is arranged along the side edge of the lower corner portion of the window pane 13. The drainage passage 35 is provided so as to pass through the inward portion 30 (the main body 28 and the seal portion 29) in the inner and outer circumferential directions of the window pane 13. The inlet portion 35a of the drainage passage 35 opens toward the inward circumferential side of the window pane 13 and is arranged on the surface of the window pane 13. An outlet portion 35b of the drainage passage 35 is arranged further toward the outer circumferential side of the window pane 13 than the end surface of the window pane 13, is spaced apart from the surface of the window pane 13, and is arranged further toward the vehicle interior side than the window pane 13.

In the second embodiment, a protrusion 36 that protrudes from the inward portion 30 toward the outer circumferential side of the window pane 13 is provided so as to be curved or bent toward the vehicle interior side. Additionally, the drainage passage 35 is formed by a hole portion 37 provided to the inward portion 30 (the main body 28 and the seal portion 29) and a water channel 38 provided to the protrusion 36. As shown in FIGS. 6 and 7, the water channel 38 is a groove with a U-shaped cross-section that is formed to the protrusion 36. In addition, the water channel 38 is not limited to the groove with a U-shaped (with round corners) cross-section, and may be grooves with other shapes (for example, a groove with a V-shaped cross-section, a groove with a U-shaped (with all corners in right angles) cross-section, and the like).

In the aforementioned second embodiment, the water channel 38 of the drainage passage 35 is the groove formed to the protrusion 36. Thus, the mold structure of the portion that molds the water channel 38 (groove) of the drainage passage 35 can be simplified.

In addition, in the aforementioned second embodiment, the drainage passage 35 is provided to the portion of the inward portions 30 of the corner portion 15B that corresponds to the main body 28 and the seal portion 29. However, the invention is not limited thereto. For example, a drainage passage may be provided to the portion of the inward portion 30 of the corner portion 15B that corresponds to the seal portion 29.

Additionally, in the aforementioned first and second embodiments, the drainage passage is provided to the portion of the inward portion 30 of the corner portion 15B that is arranged along the side edge of the lower corner portion of the window pane 13. However, the invention is not limited thereto. For example, a drainage passage may be provided to the portion of the inward portion 30 of the corner portion 15B that is arranged along the lower edge of the lower corner portion of the window pane 13, or drainage passages may be respectively provided to both the portions of the inward portion 30 of the corner portion 15B that is arranged along the side edge and the lower edge of the lower corner portion of the window pane 13.

Third Embodiment

Next, a third embodiment of the invention will be described with reference to FIGS. 8 to 9. However, substantially the same portions as in the aforementioned first embodiment will be described by the same reference numerals, and the description thereof will be omitted or simplified, and portions different from in the aforementioned first embodiment will mainly be described.

Figure 8:
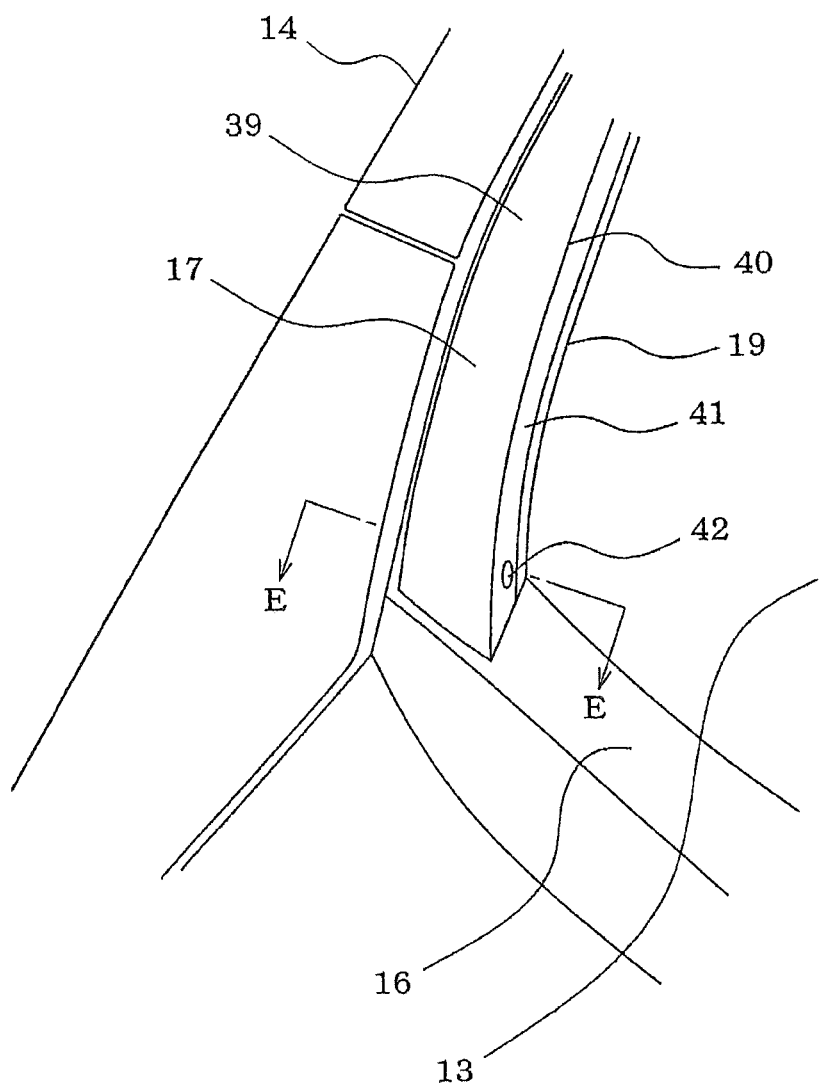
FIG. 8 is a perspective view of the periphery of a lower corner portion of a front window in a vehicle on which a front pillar garnish of a third embodiment is mounted.

In the third embodiment, as shown in FIG. 8, a front pillar garnish 39 (molded product) is arranged from the side edge of the upper corner portion of the window pane 13 along the side edge of the lower corner portion of the window pane 13, and the cowl louver 16 is arranged along the lower edge of the window pane 13.

Figure 9:
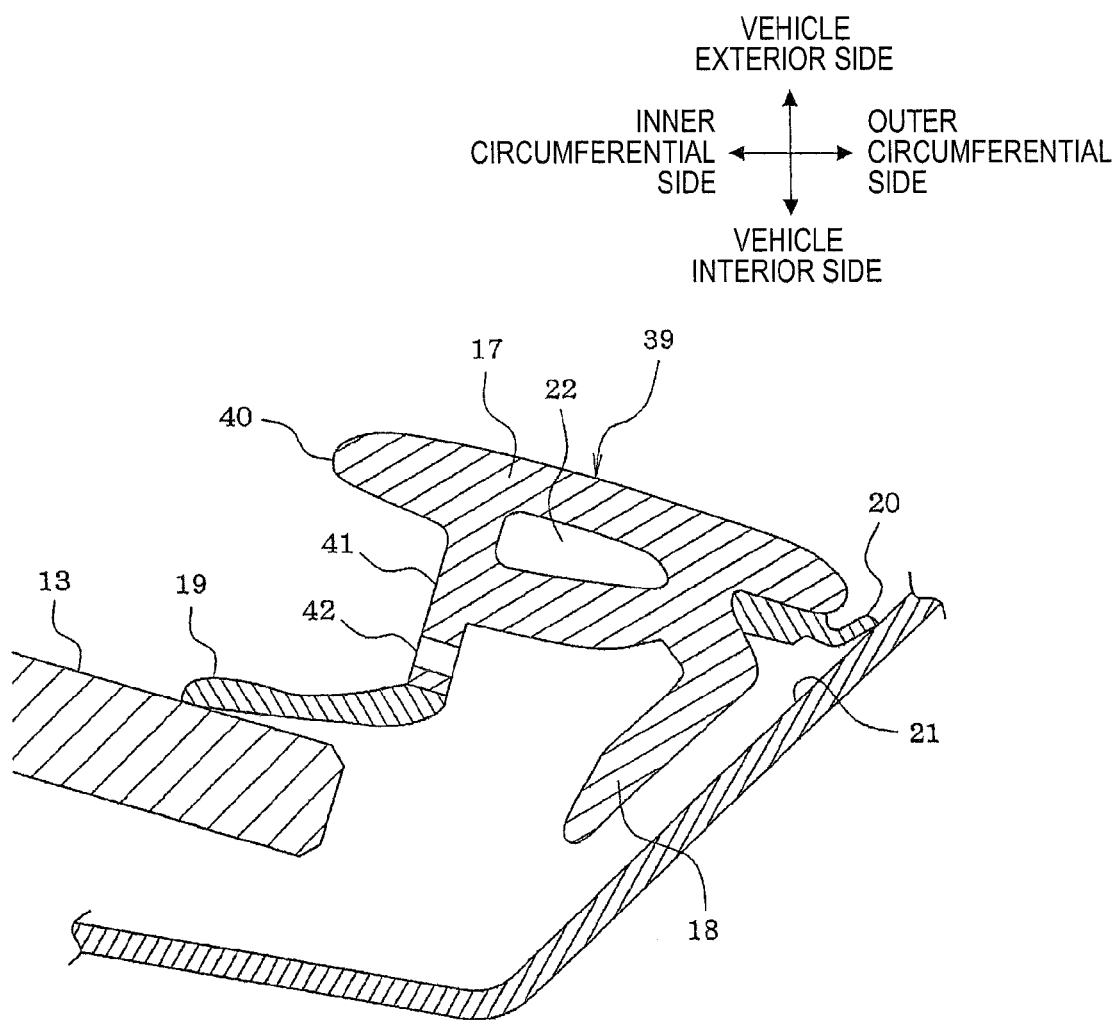
FIG. 9 is a E-E cross-sectional view of FIG. 8.

As shown in FIG. 9, in the front pillar garnish 39, the main body 17, the attachment portion 18, the seal portion 19, and the lip portion 20 are integrally provided, and the portion of the main body 17 and the seal portions 19 that face the inner circumferential side of the window pane 13 are defined as an inward portion 40. A concave portion 41 is formed along a longitudinal direction of the front pillar garnish 39 in the inward portion 40.

Additionally, a drainage passage 42 is provided to a portion of the inward portion 40, which corresponds to the bottom of the concave portion 41 and is arranged along the side edge of the lower corner portion of the window pane 13, so as to pass through the inward portion 40 (main body 17) in the inner and outer circumferential directions of the window pane 13. The drainage passage 42 is formed by a hole portion provided to the inward portion 40 (main body 17).

In the third embodiment described above, the drainage passage 42 is formed to the hole portion provided to the inward portion 40. Thus, the drainage passage 42 can be easily formed.

Additionally, in the third embodiment, the concave portion 41 is formed along the longitudinal direction of the front pillar garnish 39 in the inward portion 40. Thus, rainwater carried to the side portion of the window pane 13 by the wiper can be efficiently made to flow to the lower corner portion of the window pane 13 by the concave portion 41 formed to the inward portion 40 of the front pillar garnish 39.

Moreover, in the third embodiment, the drainage passage 42 is provided to the portion of the inward portions 40 corresponding to the bottom of the concave portion 41. Thus, the drainage passage 42 can not be easily seen from the vehicle exterior side, and appearance can be prevented from being impaired due to the drainage passage 42.

Fourth Embodiment

Next, a fourth embodiment of the invention will be described with reference to FIGS. 10 to 11. However, substantially the same portions as in the aforementioned first embodiment will be described by the same reference numerals, and the description thereof will be omitted or simplified, and portions different from in the aforementioned first embodiment will mainly be described.

Figure 10:
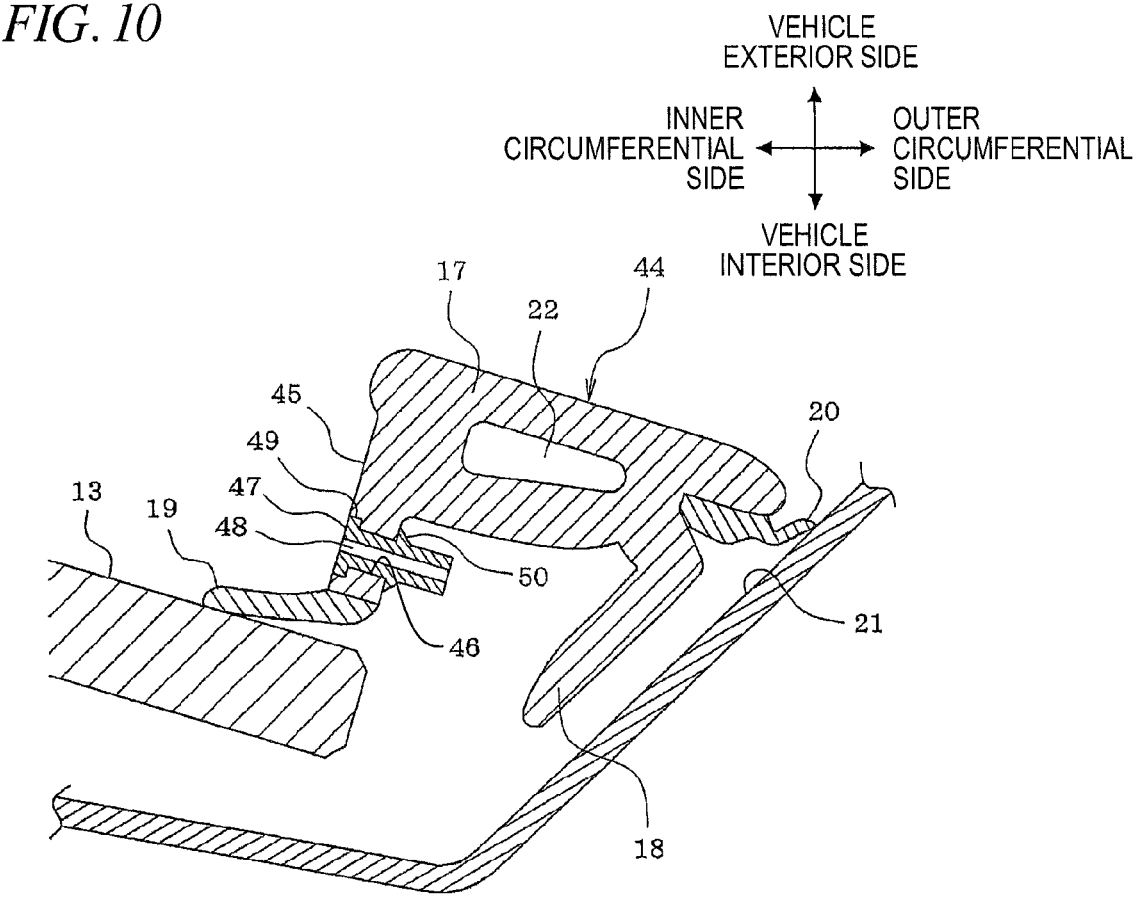
FIG. 10 is a cross-sectional view of a front pillar garnish of a fourth embodiment.

In the fourth embodiment, as shown in FIG. 10, the main body 17, the attachment portion 18, the seal portion 19, and the lip portion 20 are integrally provided in the front pillar garnish 44 (molded product), and the portion of the main body 17 and the seal portions 19 that face the inner circumferential side of the window pane 13 are defined as an inward portion 45. An attachment hole 46 is formed to the portion of the inward portion 45 that is arranged along the side edge of the lower corner portion of the window pane 13. A drainage passage 48 is formed by attaching a drainage passage formation member 47 made of resin or rubber to the attachment hole 46. In this case, a through hole formed to the drainage passage formation member 47 serves as the drainage passage 48.

Figure 11:
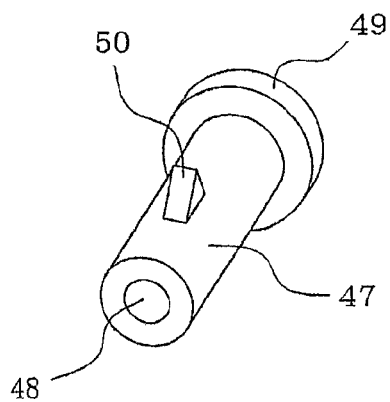
FIG. 11 is a perspective view of a drainage passage formation member.

As shown in FIG. 11, a disk-shaped major diameter head portion 49 is provided at one end portion of the drainage passage formation member 47, and wedge-shaped fitting claws 50 are provided to a plurality of places (for example, two places) on an outer circumferential surface of the drainage passage formation member 47 that are apart by a predetermined distance from the major diameter head portion 49.

As shown in FIG. 10, the drainage passage formation member 47 is attached and fixed to the attachment hole 46 of the inward portion 45 by inserting the drainage passage formation member 47 into the attachment hole 46 of the inward portion 45 and sandwiching the inward portion 45 (outer circumferential edge of the attachment hole 46) between the major diameter head portion 49 and the fitting claws 50 of the drainage passage formation member 47. In addition, the drainage passage formation member 47 may be bonded with an adhesive or the like or welded to the attachment hole 46 of the inward portion 45.

In the fourth embodiment described above, the drainage passage 48 is formed by attaching the drainage passage formation member 47 to the attachment hole 46 of the inward portion 45. For this reason, even when the drainage passage 48 is relatively long, the drainage passage 48 can be formed by a simple method of attaching the drainage passage formation member 47 to the inward portion 45 without complicating the mold structure of the portion that molds the inward portion 45.

In addition, in the aforementioned fourth embodiment, the attachment hole 46 is molded when the main body 17 and the attachment portion 18 are molded by the gas assist injection molding. However, the invention is not limited to this, and the attachment hole 46 may be molded after the main body 17 and the attachment portion 18 are molded.

Additionally, although the invention is applied to the front pillar garnish arranged along the front pillar in the aforementioned respective first to fourth embodiments, the invention is not limited to this. For example, the invention may be applied to pillar garnishes arranged along other pillars, such as a center pillar and a rear pillar (a pillar garnish arranged along at least a portion of the lower corner portion of the window pane).

Moreover, the invention is not limited to the pillar garnish, but may also be applied to a corner member arranged continuously along the side edge and the lower edge of the lower corner portion of the window pane. Even in this way, since the inward portion continuously abuts against a portion from the side edge of the lower corner portion of the window pane to the lower edge thereof, rainwater can be prevented from entering the vehicle interior side of the window pane from the lower corner portion.

The present invention provides illustrative, non-limiting aspects as follows:

(1) In a first aspect, there is provided a molded product made of resin or rubber and configured to be arranged along at least a portion of a lower corner portion of a window pane that is configured to be attached to a window frame of a vehicle, the molded product including: an inward portion that faces an inner circumferential side of the window pane and abuts against a surface of the window pane when the molded product is arranged along at least the portion of the lower corner portion; and at least one drainage passage that is provided to a portion of the inward portion arranged along the lower corner portion and that passes through the inward portion in inner and outer circumferential directions of the window pane, wherein an inlet portion of the drainage passage opens toward the inner circumferential side of the window pane, and wherein an outlet portion of the drainage passage is arranged further toward an outer circumferential side of the window pane than an end surface of the window pane and is spaced apart from the surface of the window pane.

Accordingly, rainwater that flows to the lower corner portion of the window pane along the surface of the window pane or the inward portion of the molded product can be drained by the drainage passage. In that case, since the outlet portion of the drainage passage is arranged further toward the outer circumferential side of the window pane than the end surface of the window pane and is spaced apart from the surface of the window pane, rainwater discharged from the outlet portion of the drainage passage can be made to flow to a position distant from the window pane. This can prevent rainwater flowing to the lower corner portion of the window pane from flowing along the lower edge of the window pane and dropping at the vicinity of the center of the vehicle in the width direction than the outlet portion of the drainage passage.

(2) In a second aspect, there is provided the molded product according to the first aspect, further including: a protrusion that protrudes from the inward portion toward the outer circumferential side of the window pane, wherein the drainage passage includes a hole portion provided to the inward portion and a water channel provided to the protrusion.

Accordingly, the distance from the end surface of the window pane to the outlet portion of the drainage passage can be lengthened, and rainwater discharged from the outlet portion of the drainage passage can be reliably made to flow to a position distant from the window pane.

(3) In a third aspect, there is provided the molded product according to the second aspect, wherein the water channel is a through hole formed to the protrusion.

Accordingly, rainwater passing through the drainage passage can be prevented from falling from the water channel (through hole).

(4) In a fourth aspect, there is provided the molded product according to the second aspect, wherein the water channel is a groove formed to the protrusion.

Accordingly, the mold structure of the portion that molds the water channel (groove) can be simplified.

(5) In a fifth aspect, there is provided the molded product according to the first aspect, wherein the drainage passage is formed by attaching a drainage passage formation member having a through hole to an attachment hole provided to the inward portion.

Accordingly, the drainage passage can be formed by a simple method of attaching the drainage passage formation member to the inward portion.

(6) In a sixth aspect, there is provided the molded product according to any one of the first to fifth aspects, wherein the molded product is a front pillar garnish arranged from a side edge of an upper corner portion of the window pane along at least a side edge of the lower corner portion.

Accordingly, rainwater carried to a side portion of the window pane by a wiper can be made to flow to the lower corner portion of the window pane by the inward portion of the front pillar garnish, and rainwater that has flowed to the lower corner portion of the window pane can be drained by the drainage passage.

(7) In a seventh aspect, there is provided the molded product according to the sixth aspect, wherein a concave portion is formed to the inward portion along a longitudinal direction of the front pillar garnish.

Accordingly, rainwater carried to a side portion of the window pane by a wiper can be efficiently made to flow to the lower corner portion of the window pane by the concave portion formed to the inward portion of the front pillar garnish.

(8) In an eighth aspect, there is provided the molded product according to the seventh aspect, wherein the drainage passage is provided to a portion of the inward portion corresponding to a bottom of the concave portion.

Accordingly, the drainage passage can not be easily seen from the vehicle exterior side, and appearance can be prevented from being impaired due to the drainage passage.

(9) In a ninth aspect, there is provided the molded product according to any one of the sixth to eighth aspects, wherein the front pillar garnish is arranged continuously from along the side edge of the upper corner portion to along the side edge and a lower edge of the lower corner portion.

Accordingly, since the inward portion successively abuts against a portion from the side edge of the lower corner portion of the window pane to the lower edge thereof, rainwater can be prevented from entering the outer circumferential side of the window pane from the inward portion arranged at the lower corner portion of the window pane.

(10) In a tenth aspect, there is provided the molded product according to the ninth aspect, wherein the drainage passage is provided to at least one of a portion of the inward portion that is arranged along the side edge of the lower corner portion and a portion of the inward portion that is arranged along the lower edge of the lower corner portion.

Accordingly, rainwater that flows to the lower corner portion of the window pane along the inward portion can be effectively drained by the drainage passage.

(11) In an eleventh aspect, there is provided the molded product according to any one of the first to fifth aspects, wherein the molded product is a corner member arranged continuously along a side edge and a lower edge of the lower corner portion.

Since the inward portion successively abuts against a portion from the side edge of the lower corner portion of the window pane to the lower edge thereof even in this way, rainwater can be prevented from entering the outer circumferential side of the window pane from the inward portion arranged at the lower corner portion.

What is claimed is:

1. A molded product made of resin or rubber and configured to be arranged along at least a portion of a lower corner portion of a window pane that is configured to be attached to a window frame of a vehicle, the molded product comprising:
   an inward portion that faces an inner circumferential side of the window pane and abuts against a surface of the window pane when the molded product is arranged along at least the portion of the lower corner portion;
   at least one drainage passage that is provided to a portion of the inward portion arranged along the lower corner portion and that passes through the inward portion in inner and outer circumferential directions of the window pane; and
   a protrusion that protrudes from the inward portion toward the outer circumferential side of the window pane,
   wherein an inlet portion of the drainage passage opens toward the inner circumferential side of the window pane,
   wherein an outlet portion of the drainage passage is arranged further toward an outer circumferential side of the window pane than an end surface of the window pane and is spaced apart from the surface of the window pane, and
   wherein the drainage passage includes a hole portion provided to the inward portion and a water channel provided to the protrusion.

2. The molded product according to claim 1, wherein the water channel is a through hole formed to the protrusion.

3. The molded product according to claim 1, wherein the water channel is a groove formed to the protrusion.

4. The molded product according to claim 1, wherein the molded product is a front pillar garnish arranged from a side edge of an upper corner portion of the window pane along at least a side edge of the lower corner portion.

5. The molded product according to claim 4, wherein a concave portion is formed to the inward portion along a longitudinal direction of the front pillar garnish.

6. The molded product according to claim 5, wherein the drainage passage is provided to a portion of the inward portion corresponding to a bottom of the concave portion.

7. The molded product according to claim 4, wherein the front pillar garnish is arranged continuously from along the side edge of the upper corner portion to along the side edge and a lower edge of the lower corner portion.

8. The molded product according to claim 7, wherein the drainage passage is provided to at least one of a portion of the inward portion that is arranged along the side edge of the lower corner portion and a portion of the inward portion that is arranged along the lower edge of the lower corner portion.

9. The molded product according to claim 1, wherein the molded product is a corner member arranged continuously along a side edge and a lower edge of the lower corner portion.

10. A molded product made of resin or rubber and configured to be arranged along at least a portion of a lower corner portion of a window pane that is configured to be attached to a window frame of a vehicle, the molded product comprising:
   an inward portion that faces an inner circumferential side of the window pane and abuts against a surface of the window pane when the molded product is arranged along at least the portion of the lower corner portion; and
   at least one drainage passage that is provided to a portion of the inward portion arranged along the lower corner portion and that passes through the inward portion in inner and outer circumferential directions of the window pane,
   wherein an inlet portion of the drainage passage opens toward the inner circumferential side of the window pane, and
   wherein an outlet portion of the drainage passage is arranged further toward an outer circumferential side of the window pane than an end surface of the window pane and is spaced apart from the surface of the window pane,
   wherein the drainage passage is formed by attaching a drainage passage formation member having a through hole to an attachment hole provided to the inward portion.

* * * * *